Sept. 25, 1951      R. K. SUPER      2,568,777

BRAKE SHOE

Filed Oct. 13, 1947

INVENTOR.
Ralph K. Super
BY
Strauch & Hoffman
Attorneys

Patented Sept. 25, 1951

2,568,777

UNITED STATES PATENT OFFICE 2,568,777

BRAKE SHOE

Ralph K. Super, Detroit, Mich., assignor to The Timken-Detroit Axle Company, Detroit, Mich., a corporation of Ohio Application October 13, 1947, Serial No. 779,547

3 Claims. (Cl. 188—250)

1

This invention relates generally to internally expanding brakes and more specifically to improved fabricated brake shoes for heavy duty brakes of this type. The invention comprises a brake shoe provided with an arcuate platform on which the lining material is mounted and a channel shaped reenforcing member secured along the inner periphery of the platform.

It is therefore the major object of this invention to provide a fabricated brake shoe having an arcuate platform adapted to carry a friction lining member on its outer periphery and having a reenforcing member of channel shaped transverse cross-section secured along its inner periphery.

It is a further object of this invention to provide a brake shoe having an arcuate platform with a reenforcing member secured along its inner periphery, the reenforcing member comprising a pair of laterally spaced radially extending side walls connected together at one of their peripheries.

It is a still further object of this invention to provide a novel brake shoe having an arcuate lining mounting platform and a reenforcing member secured along the inner periphery of the platform, the reenforcing member having a pair of spaced side walls projecting inwardly from the platform, a lateral flange on the outer periphery of each side wall for securing the walls to the platform and an arcuate web connecting the inner peripheries of said side walls.

Another object of this invention is to provide a brake shoe having an arcuate platform and a channel shaped reenforcing member secured along the inner periphery of the platform, the channel of the reenforcing member being of a greater depth intermediate the ends of the member.

A still further object of this invention is to provide a brake shoe having an arcuate platform and a channel shaped reenforcing member with spaced side walls secured along the inner periphery of the platform and reenforcing closures at each end.

A still further object of this invention is to provide a brake shoe having an arcuate platform and a channel shaped reenforcing member with spaced side walls secured along the inner periphery of the platform and a yoke secured to each extremity of the reenforcing member to close and strengthen the channel formed between the spaced side walls and provide a pair of spaced legs on opposite ends of the shoe.

A further object of the invention is to pro-

2 vide a novel brake shoe construction embodying an arcuate lining platform reenforced by a channel extending along its inner periphery and having brake shoe pivot and cam follower support members secured across and closing opposite ends of the channel.

These and other objects will become apparent as the specification proceeds in connection with the annexed drawings wherein.

The specification continues with reference to the drawings wherein like numerals designate like parts throughout the several figures.

Figure 1:
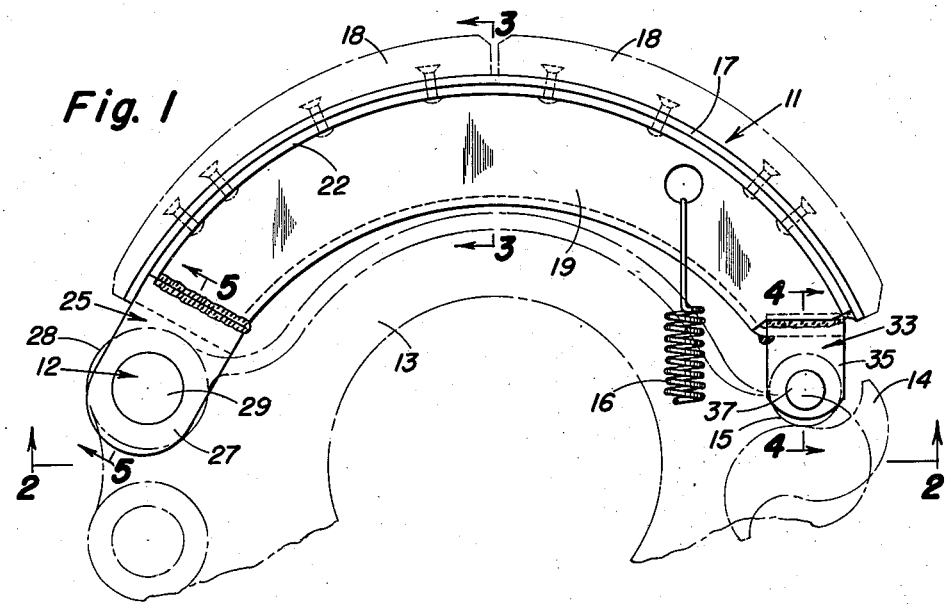
Figure 1 is a side elevation illustrating a brake shoe according to a preferred embodiment of this invention, the axle flange on which the brake shoe is pivoted and the actuating cam being illustrated in phantom lines.
Figure 2:
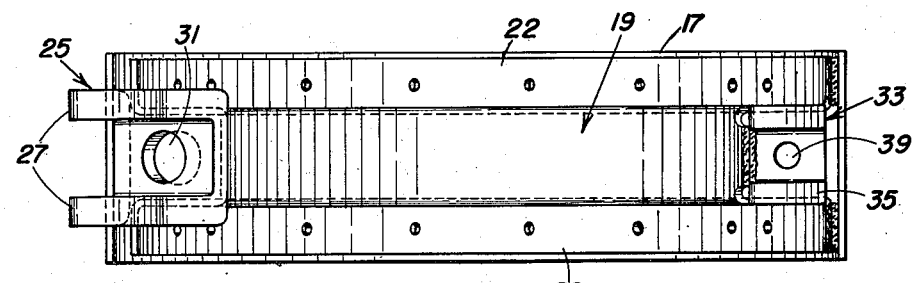
Figure 2 is an inner end view of the brake shoe looking substantially along line 2—2 of Figure 1 and illustrating the manner in which the reenforcing member is secured to the shoe platform.
Figure 5:
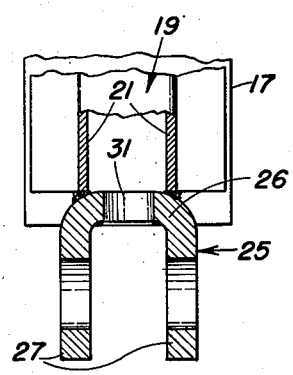
Figure 5 is a section on line 5—5 of Figure 1 illustrating the yoke for pivotally mounting the brake shoe.

Figure 1 illustrates the invention as mounted for operation in an axle assembly. A brake shoe generally indicated at 11 is pivotally mounted at one end at 12 on an axle mounted flange 13. At the opposite end of the shoe, flange 13 carries a rotatable cam 14 which acts with a cam follower roller 15 for actuating the shoe. A tension spring 16 resiliently holds the cam follower and cam in contact.

Figure 3:
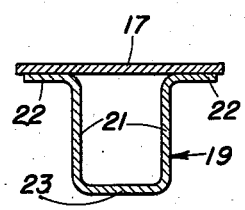
Figure 3 is a section on line 3—3 of Figure 1 illustrating intermediate structure of the brake shoe.
Figure 4:
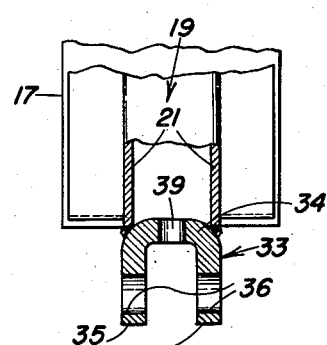
Figure 4 is a section on line 4—4 of Figure 1 illustrating the yoke for mounting a cam following roller.

The brake shoe comprises an arcuate metal band 17 serving as a platform for mounting one or more friction lining elements 18 with a reenforcing member 19 welded or otherwise permanently secured along the inner periphery of the platform. The reenforcing member, which is preferably a channel with its open side facing the platform as illustrated in Figure 3, comprises a pair of laterally spaced radially extending side walls 21 having along their outer peripheries outwardly extending peripheral flanges 22 shaped to follow the curvature of the platform and have a considerable surface area of contact with the inner side of the platform. Flanges 22 are preferably welded to the platform and thus strengthen side walls 21 laterally and also reenforce the platform against deflection. An arcuate web 23, which in Figure 3 is the bottom wall of the channel, integrally connects the inner peripheries of side walls 21 for adding resistance to transverse deflection. Preferably the inner radius of curvature of web 23 is eccentric to the radius of curvature of platform 17 to make the reenforcing channel deeper intermediate the ends of the shoe so that the shoe has maximum resistance where bending is greatest.

One end of the brake shoe is provided with a pivot mounting which also further strengthens the shoe. Preferably this mounting comprises a yoke 25 which is secured to the shoe at one open end of channel 19. Yoke 25 comprises a plate 26 which extends across and substantially closes the open end of the channel and is welded to side walls 21 and web 23 of the reenforcing member and has a pair of spaced legs 27 extending from the end of the shoe. Legs 27 embrace a boss 28 on flange 13 and a suitable pin 29 is provided to pivot the brake shoe on the flange. An opening 31 is formed in plate 26 for cleaning out and draining the channel.

The other end of the brake shoe is provided with a cam follower mounting which also strengthens the shoe. Preferably this mounting is a yoke 33 which is secured to the shoe at the other end of the channel. Yoke 33 comprises a plate 34 which extends across and substantially closes the open end of the channel and is welded to both side walls 21 and web 23 of the reenforcing member and has a pair of spaced legs 35 extending toward the end of the shoe. Legs 35 are apertured at 36 to mount a shaft 37 for journalling cam follower roller 15 between them. An opening 39 is provided in plate 34 for cleaning out and draining the channel.

I have thus provided a fabricated brake shoe which utilizes a minimum amount of metal with considerable structural rigidity. The shoe is preferably made up of four elements, the platform, reenforcing channel and the two end yokes which are all welded together and supply mutual strength in the assembly. The channel affords extremely good resistance to longitudinal bending of the lining platform, and its manner of attachment to the platform effectively thickens the platform and increases its resistance to deformation even at the high temperatures encountered in heavy duty braking. The yokes, besides providing the pivot and cam follower attachments, bridge the channel ends and thereby increase the rigidity of the channel and the overall resistance of the shoe to distortion.

A series of apertures are provided in platform to receive fastening elements such as rivets for securing the friction lining elements to the shoe, and these apertures also pass through the lateral flanges of the reenforcing channel whereby the rivets help to strengthen the connection between the platform and the reenforcing member.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the equivalency of the claims are therefore intended to be embraced therein.

What is claimed and desired to be secured by United States Letters Patent is:

1. A brake shoe comprising an arcuate platform provided with a friction lining attachment surface, a reenforcing metal channel member having laterally extending flanges secured along the surface of said platform opposite said lining attachment surface, said flanges effectively thickening the platform and increasing its resistance to deformation in service, an anchor pin pivot mount for said shoe secured permanently to one end of said shoe comprising a yoke of metal of much heavier gauge than said channel member bridged across the adjacent open end of said channel member and welded thereto and having spaced apertured pivot legs projecting from the end of the shoe, and a cam follower roller mount secured permanently to the other end of said shoe comprising a yoke of metal of much heavier gauge than said channel member bridged across the adjacent open end of said channel member and welded thereto and having spaced apertured roller pivot legs projecting from said other end of the shoe, said legs all being substantially parallel to each other and the side walls of said channel member.

2. A fabricated brake shoe structure consisting of an arcuate metal platform of substantial strength having an outer surface serving as the underlying support for a friction lining, a similarly arcuate metal channel having its open end welded along the inner surface of said platform out of contact with said lining, a substantially U-shaped anchor pin pivot mount member of much heavier gauge metal than said channel having its closed end bridged across one end of said channel and welded to the platform and the channel side walls, which latter are rigidly spaced thereby, and a substantially U-shaped cam follower roller support member of much heavier gauge metal than said channel having its closed end bridged across the other end of said channel and welded to the platform and the channel side walls, which latter are rigidly spaced thereby, said assembly comprising a permanent unitary welded construction of high strength and resistance to deformation during operation of the brake, and all of the arms of said U-shaped members extending from the ends of said channel parallel to each other and the channel sides.

3. A fabricated brake shoe structure consisting of four metal elements permanently secured together into a unitary structure wherein they mutually reinforce each other comprising a longitudinally arcuate channel member, a friction lining platform secured along and across the open side of said channel member, and reinforcing yokes of much heavier gauge than said channel member welded across the open opposite ends of said channel member, each yoke having spaced legs projecting from the end of said brake shoe generally parallel to each other and to the channel side walls.

RALPH K. SUPER.

REFERENCES CITED

The following references are of record in the file of this patent:

UNITED STATES PATENTS

| Number | Name | Date |
| --- | --- | --- |
| 1,794,348 | Chase | Feb. 24, 1931 |
| 1,957,635 | Evans | May 8, 1934 |